March 26, 1957
A. P. LIST
2,786,921
BATTERY SWITCH
Filed March 5, 1956
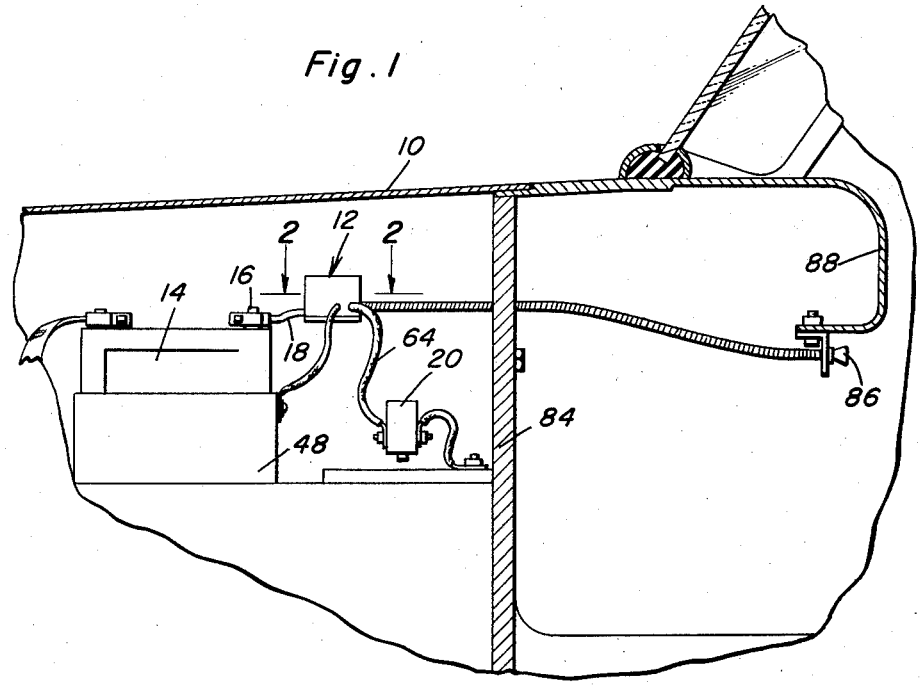
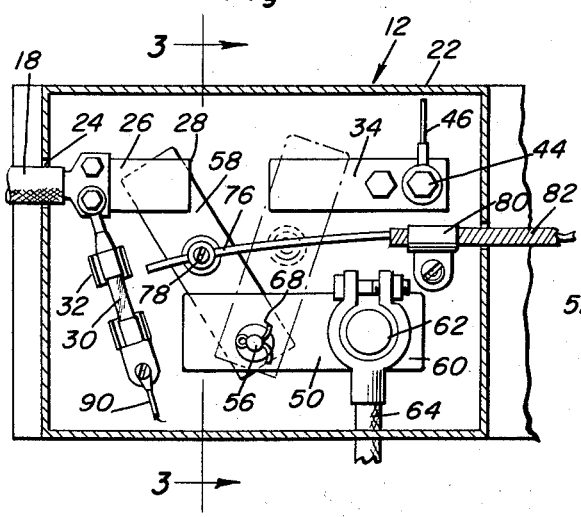
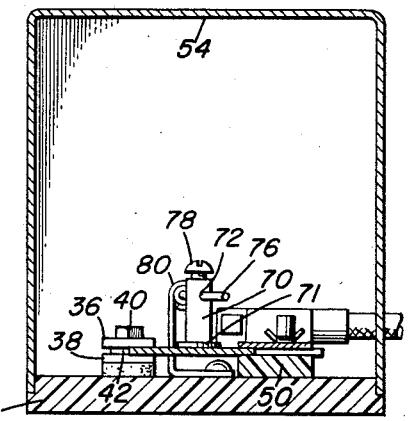
Adolph P. List
INVENTOR.
BY *Clarence A. O'Brien*
*and Harvey B. Jackson*
Attorneys United States Patent Office 2,786,921
Patented Mar. 26, 1957

2,786,921

BATTERY SWITCH

Adolph P. List, Carlyle, Ill.

Application March 5, 1956, Serial No. 569,465

1 Claim. (Cl. 200—161)

This invention relates to an accessory for an automotive vehicle and more particularly to a novel battery safety switch adapted to be installed for control of the battery powered circuits of a vehicle.

The primary object of the present invention resides in the provision of a battery safety switch adapted to safeguard the electrical systems of a vehicle.

A further object of the present invention resides in the provision of a battery safety switch which is designed for enabling the major electrical system of the vehicle to be positively disconnected from the battery at such times as may be desired so as to eliminate the possibility of electrical fires due to short circuits or the like especially when the vehicle is left unattended.

An additional object of the invention resides in the provision of means for prohibiting the theft of a vehicle having the invention installed therein by providing means for disconnecting the battery from the ignition system of the vehicle therefore preventing the operation thereof.

The construction of this invention features a battery safety switch connected to the positive or negative terminal to which the hot line of the battery between the battery and the major electrical system of the vehicle including the ignition and distribution system thereof are connected. Means are provided for grounding all of the electrical systems upon operation of the switch from a knob connected to the switch by a cable which knob may be concealed underneath the instrument panel of the vehicle or in such other place as may be desired.

Still further objects and features of this invention reside in the provision of a battery switch that is simple in construction, efficient in use, strong and durable, positive in action, and which may be made at a relatively low cost thereby permitting wide distribution and utilization.

These, together with the various ancillary objects and features of the invention which will become apparent as the following description proceeds, are attained by this battery switch, a preferred embodiment of which has been illustrated in the accompanying drawings, by way of example only, wherein:

Figure 1 is an elevational view of the battery switch shown in combination with the battery of a vehicle with portions of the vehicle being shown in section to enable the invention to be seen with clarity;

Figure 2 is a horizontal sectional view as taken along the plane of line 2—2 in Figure 1 illustrating in plan view the major components of the invention; and Figure 3 is a vertical sectional view as taken along the plane of line 3—3 of Figure 2 illustrating in particular the construction of the movable switch member with respect to the other components of the invention.

With continuing reference to the accompanying drawings wherein like reference numerals designate similar parts throughout the various views, reference numeral 10 is used to generally designate an automotive vehicle such as an automobile, truck, tractor or the like in which the invention generally designated by the reference numeral 12 is adapted to be installed. This invention 12 consists of a battery safety switch adapted to be associated with the battery 14 of the vehicle 10 and connected to the terminal 16 thereof through the hot lead 18 so as to be interposed between the battery 14 and the solenoid switch 20 or starter switch if such solenoid switch 20 is not utilized, thereby breaking connection between battery 14 and all electrical components of the vehicle such as the ignition and distribution system, radio, lights, generator, and starter.

The battery safety switch 12 is contained with a base 22 and is supported by connection of the hot wire 18 to the terminal 16 of the battery 14 or may be otherwise mounted in any convenient manner as may be desired. The base 22 has a cover 54 having an aperture 24 therethrough through which the hot wire 18 extends as well as other suitable apertures through which other conductors of the cable may extend as will hereinafter become apparent.

Mounted in the base 22 is a first fixed contact 26 which includes upper and lower spaced contact plates the upper contact plate being indicated at 28. The hot wire 18 is secured to the fixed contact 26 as is a fuse 30 mounted in a fuse holder 32 connected to the fixed contact 26 in any convenient manner. Another fixed contact 34 is provided which includes upper and lower spaced contact plates 36 and 38 arranged in a similar manner to the spaced contact plates of the fixed contact 26. A first bolt 40 holds the spaced contact plates 36 and 38 in position with a spacer 42 therebetween. Connected by another bolt 44 is a conductor 46 connecting the fixed contact 34 to ground. This ground lead may be connected to the battery mounting 48 or such other portion of the vehicle as may be desired.

A fixed contact block 50 of a suitable conductive material is mounted on the insulative base 22. Mounted on the conductive block 60 is a pivot 56 on which a movable contact member 58 is mounted. Positioned above the movable contact member 58 is a contact plate 60. A post 62 rises upwardly from the contact plate 60 and block 60 and is adapted to have a hot lead 64 connected thereto for connection to solenoid switch 20 to protect the electrical system of the vehicle 10. A pin 68 is used to hold the movable contact 58 in position, using a spring and cotter key to hold the pin 68 in place. The movable contact 58 is designed to pass between the spaced contact plates as at 28 and 36 and 38 of the fixed contacts 26 and 34 in the manner of a knife switch forming a good electrical contact therewith.

In order to actuate the movable contact plate 58 a stud 70 is mounted in an insulative washer 71 fastened to plate 58 for reception of the end 76 of a flexible cable which extends through aperture 72 in the stud 70. The stud is bored for reception of a lock screw 78 which holds the flexible cable in position. A bracket 80 forms a guide and mounting member for the casing 82 of the flexible cable 76. The flexible cable 76 passes through the fire wall as at 84 of the vehicle 10 and is designed to be actuated by a knob 86 mounted beneath the instrument panel 88 of the vehicle or in any other concealed location whereby the battery 14 may be disconnected from the major electrical systems of the vehicle upon action of the switch 12 to thereby prevent theft.

As can be readily understood, with the movable contact member 58 in the position as is shown in Figure 2, an operative electrical circuit between the battery and the major electrical system is achieved due to the fact that a complete circuit through the conductor 64 is achieved. The fuse 30 and the conduit 90 attached thereto provides a circuit for various other electrical accessories such as the clock, door lights and dome lights as may be desired. With the switch in the position as it is shown in dotted lines in Figure 2, the electrical system not protected by the fuse 30 are grounded through the conduit 46.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A battery safety switch comprising in combination a battery of a vehicle, said battery having positive and negative terminals with one of said terminals being grounded, a first fixed contact connected to the other non-grounded terminal, a second fixed contact connected to ground, an insulated mounting plate, a third fixed contact, a movable contact pivotally mounted on said third fixed contact, a cable connected to said movable contact for actuating said movable contact, said movable contact being adapted for connection to vehicle system, said first fixed contact and said second fixed contact and said third contact each including upper and lower spaced contact plates, said movable contact comprising a conductive plate engageable with and movable between said upper and lower spaced contact plates of said first fixed contact and said second fixed contact plate.

References Cited in the file of this patent

UNITED STATES PATENTS

| | | |
|---|---|---|
| 1,553,354 | Baxter | Sept. 15, 1925 |
| 1,995,946 | Schild | Feb. 19, 1956 |